United States Patent [19]

Ho

[11] Patent Number: 5,501,540

[45] Date of Patent: Mar. 26, 1996

[54] BINDER ASSEMBLY WITH A LOOSE-LEAF SHEET HAVING A POUCH FOR RECEIVING A COMPUTER DISK THEREIN

[76] Inventor: Chin-Lien Ho, No. 36, Lo-Yang Rd., Hsi-Tun Dist., Taichung City, Taiwan

[21] Appl. No.: 457,561

[22] Filed: Jun. 1, 1995

[51] Int. Cl.$^6$ .................................................. B42F 13/00
[52] U.S. Cl. ................................ 402/73; 281/38; 402/70; 402/79; 206/308.1
[58] Field of Search ................................... 281/15.1, 21.1, 281/29, 38; 402/70, 73, 79; 206/311, 308.1

[56] References Cited

U.S. PATENT DOCUMENTS

| | | | |
|---|---|---|---|
| 4,676,374 | 6/1987 | Wilkins | 206/311 X |
| 4,850,731 | 7/1989 | Youngs | 402/79 |
| 5,199,743 | 4/1993 | Rosinski, III | 402/79 X |
| 5,290,118 | 3/1994 | Ozeki | 402/79 |
| 5,307,926 | 5/1994 | Mee | 206/311 |

*Primary Examiner*—Willmon Fridie, Jr.
*Attorney, Agent, or Firm*—Panitch Schwarze Jacobs & Nadel

[57] ABSTRACT

A binder assembly is used to receive computer disks therein and includes a cover unit with rigid back and front covers, a spine portion interconnecting the back and front covers, and a retaining set provided on an inner side of the spine portion. A loose-leaf sheet includes a punching unit for engaging removably the retaining set on the spine portion, and a pouch unit which is connected to the punching unit at one side and which has at least one pouch. Each pouch includes a plastic backing sheet portion, a plastic front sheet portion and a foldable retaining flap. The front sheet portion has top and bottom ends and opposite side edges. The front sheet portion is connected sealingly to the backing sheet portion at the side edges and at the bottom end. The front sheet portion cooperates with the backing sheet portion to define a disk receiving space that is adapted to receive a computer disk therein. The foldable retaining flap extends integrally from an intermediate section of the top end of the front sheet portion and is adapted to extend between the computer disk in the disk receiving space and the backing sheet portion to prevent untimely removal of the computer disk from the disk receiving space.

12 Claims, 5 Drawing Sheets

5,501,540

BINDER ASSEMBLY WITH A LOOSE-LEAF SHEET HAVING A POUCH FOR RECEIVING A COMPUTER DISK THEREIN

BACKGROUND OF THE INVENTION

1. Field Of The Invention

This invention relates to a storage device for computer disks, more particularly to a binder assembly with a loose-leaf sheet having a pouch for receiving a computer disk therein.

2. Description Of The Related Art

With reference to FIG. 1, a conventional disk storage casing 10 is shown to include a rigid first casing half 11, a rigid second casing half 12 which is connected pivotally to the first casing half 11 and which confines a receiving space for receiving a computer disk 13 therein. The drawbacks of the conventional disk storage casing 10 are as follows:

1. Referring to Fig 2, since each conventional disk storage casing 10 can only receive one computer disk 13 therein, and since each conventional disk storage casing 10 has a fixed width, a corresponding number of the conventional disk storage casings 10 must be used when storing a plurality of computer disks, thereby resulting in the need for a relatively large storage space. Furthermore, the conventional disk storage casings 10 cannot be conveniently carried by the user.

2. Since each of the disk storage casings 10 lacks a label unit for identifying the computer disk stored therein, it is time-consuming for the user to search for a desired computer disk, especially when the disk storage casings 10 are in a stack.

SUMMARY OF THE INVENTION

Therefore, the main objective of the present invention is to provide a binder assembly with a looseleaf sheet having a pouch for receiving a computer disk therein, which binder assembly can overcome the aforementioned drawbacks that associated with the prior art.

According to the present invention, a binder assembly is used to receive computer disks therein and includes a cover unit with rigid back and front covers, a spine portion interconnecting the back and front covers, and a retaining set provided on an inner side of the spine portion. Each of a plurality of loose-leaf sheets includes a punching unit for engaging removably the retaining set on the spine portion, and a pouch unit which is connected to the punching unit at one side and which has at least one pouch. Each pouch includes a plastic backing sheet portion, a plastic front sheet and a foldable retaining flap. The plastic front sheet portion has top and bottom ends and opposite side edges. The front sheet portion is connected sealingly to the backing sheet portion at the side edges and at the bottom end. The front sheet portion cooperates with the backing sheet portion to define a disk receiving space that is adapted to receive a computer disk therein. The foldable retaining flap extends integrally from an intermediate section of the top end of the front sheet portion and is adapted to extend between the computer disk in the disk receiving space and the backing sheet portion to prevent untimely removal of the computer disk from the disk receiving space.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
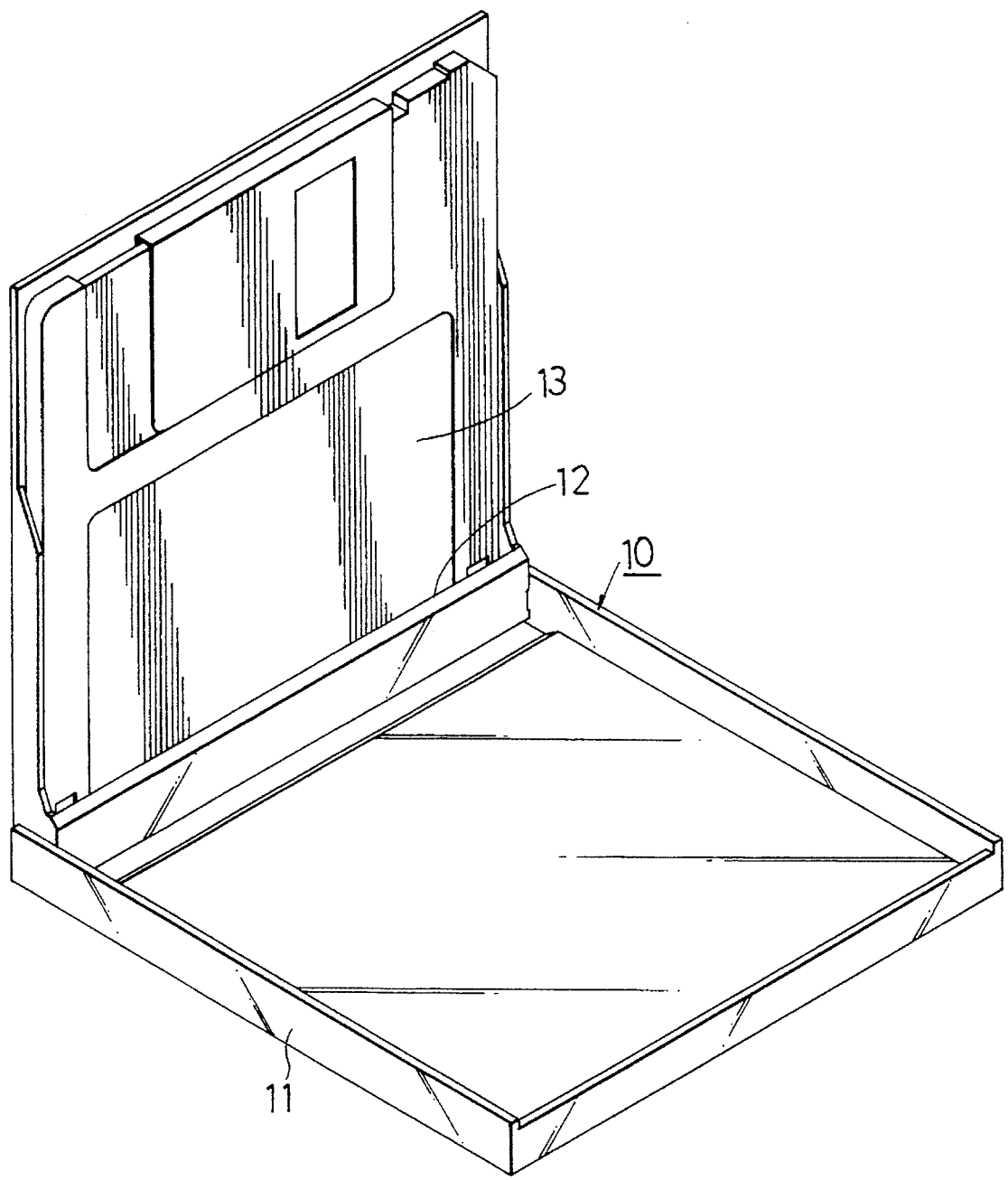
FIG. 1 is a perspective view illustrating a conventional disk storage casing.
Figure 2:
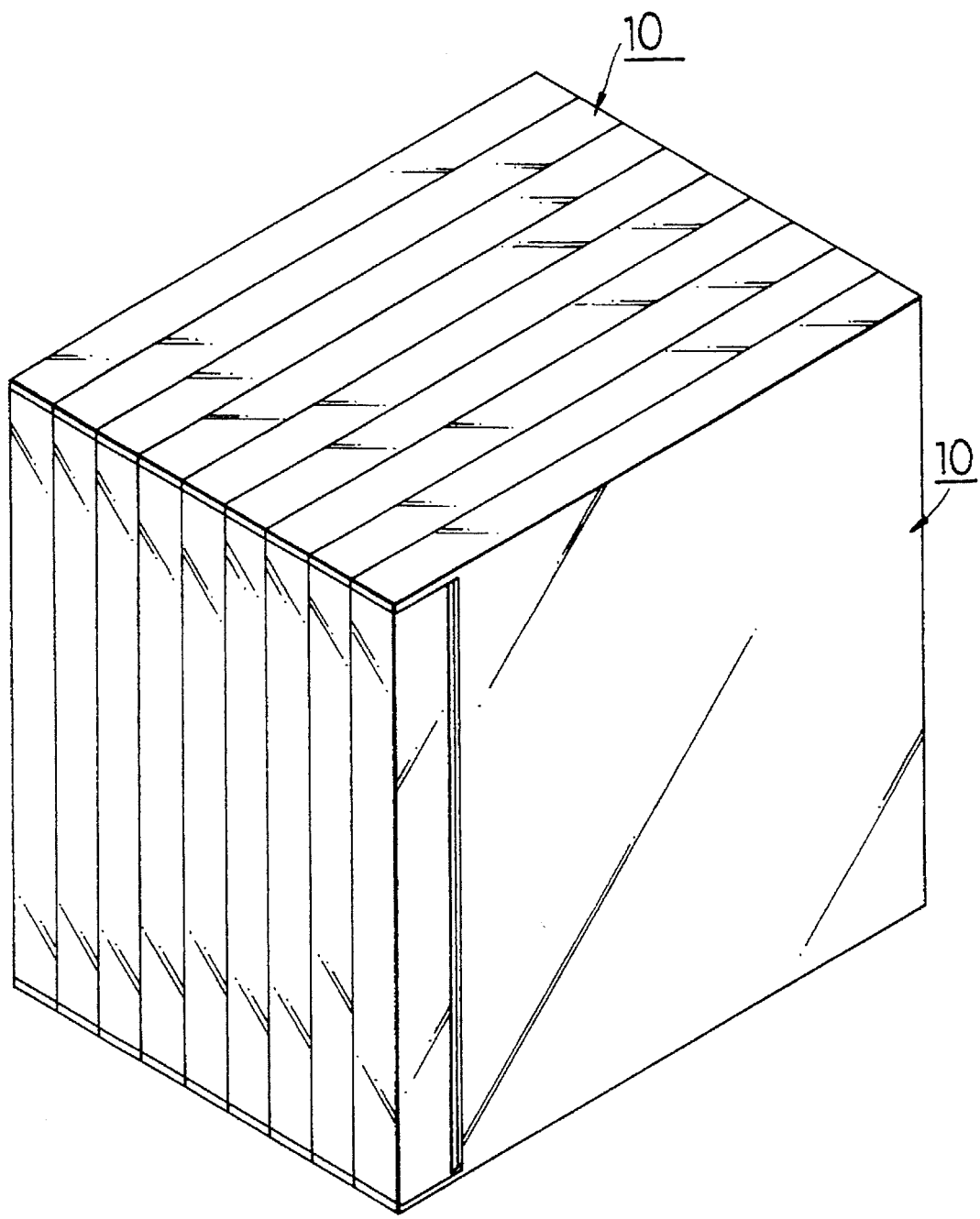
FIG. 2 is a perspective view showing a plurality of the conventional disk storage casings shown in FIG. 1.
Figure 3:
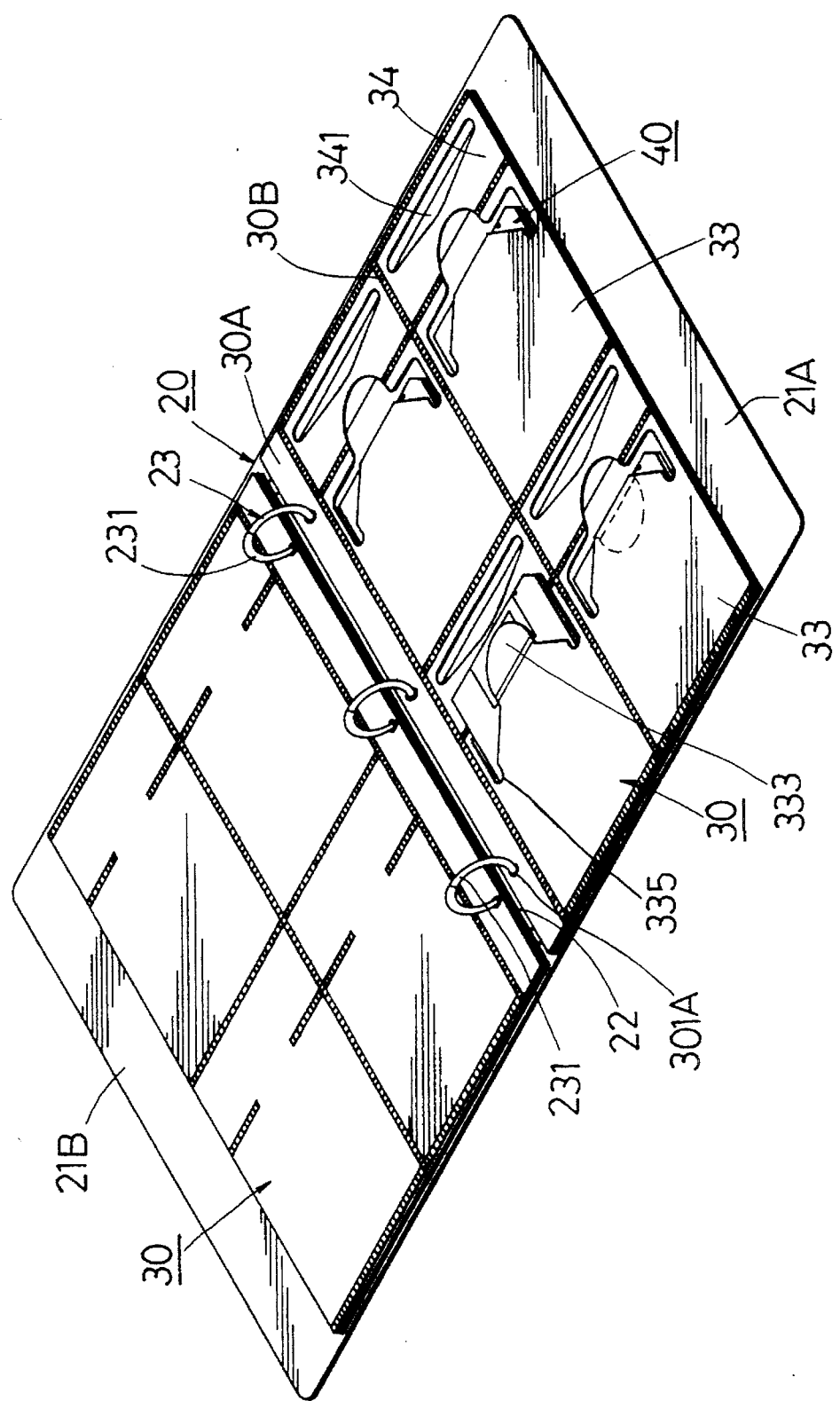
FIG. 3 is a perspective view illustrating a binder assembly according to the present invention.
Figure 4:
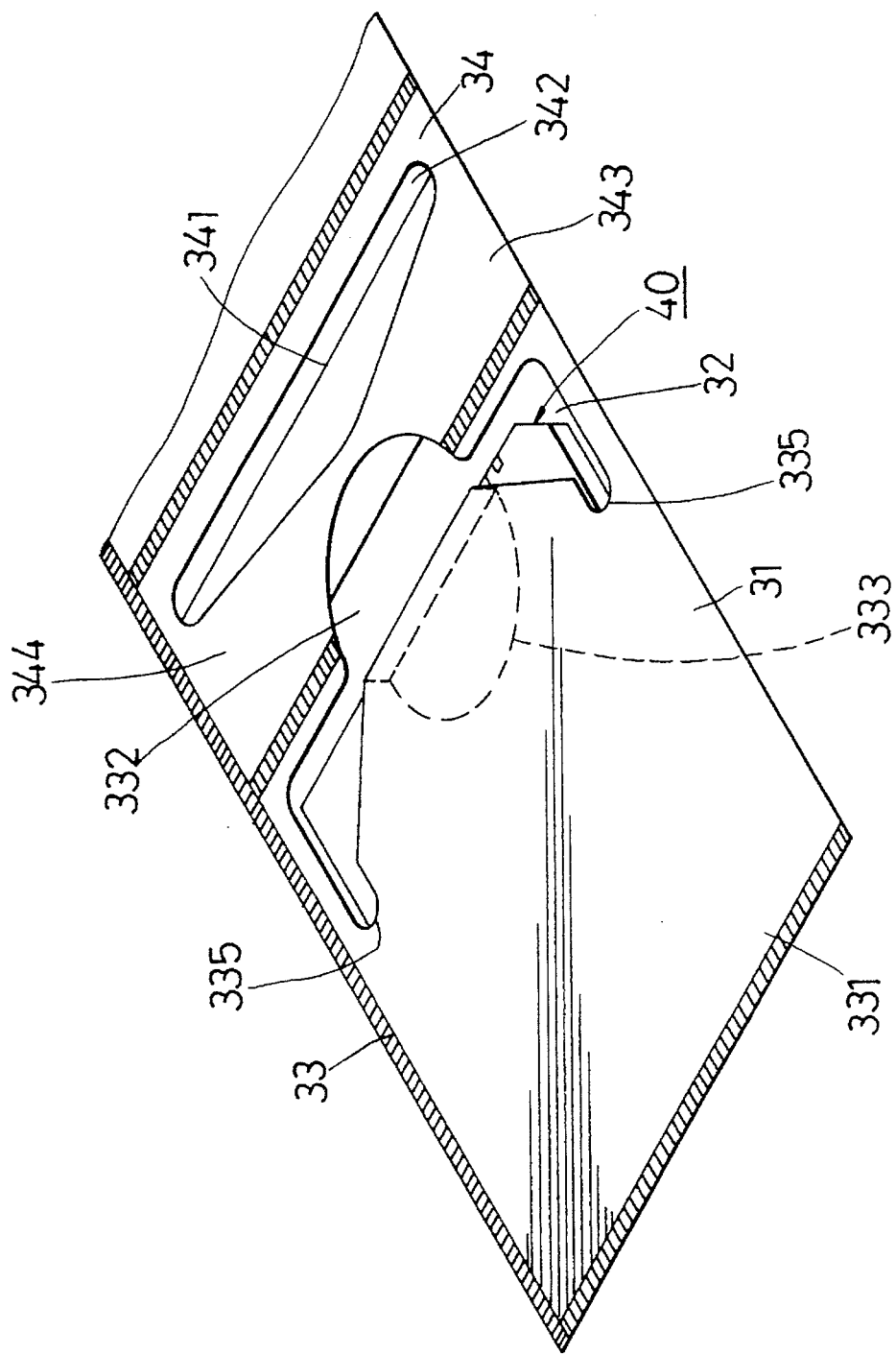
FIG. 4 is a perspective, enlarged view showing a pouch of a loose-leaf sheet of the binder assembly according to the present invention.

Referring to FIGS. 3 and 4, a binder assembly according to the present invention includes a cover unit 20 and a plurality of loose-leaf sheets 30.

The cover unit 20 includes rigid back and front covers (21A and 21B), a spine portion 22 interconnecting the back and front covers (21A and 21B), and a retaining set 23 provided on an inner side of the spine portion 22. In the present embodiment, the retaining set 23 includes three ring-shaped retainers 231. Since the structure of the ring-shaped retainers 231 is known, a detailed description thereof is thus omitted herein.

Each of the loose-leaf sheets (30) includes a punching unit (30A) which is formed with corresponding number of punched holes (301A) that are adapted to engage removably the ring-shaped retainers 231 of the retaining set 23 on the spine portion 22, and a pouch unit (30B) which is connected to the punching unit (30A) at one side and which includes a plurality of pouches 33. In the present embodiment, the pouch unit (30B) of each loose-leaf sheet (30) includes two adjacent rows of pouches 33, each row having two interconnected pouches 33. Each pouch 33 includes a plastic first backing sheet portion 32, a plastic first front sheet portion 31, a foldable retaining flap 333 and a label retaining unit 34.

The first front sheet portion 31 of each pouch 33 has top and bottom ends and opposite side edges, and is connected sealingly to the first backing sheet portion 32 at the side edges and at the bottom end. The first front sheet portion 31 cooperates with the first backing sheet portion 32 to define a disk receiving space 331 that is adapted to receive a computer disk 40 therein.

The foldable retaining flap 333 of each pouch 33 extends integrally from an intermediate section of the top end of the respective first front sheet portion 31 and is adapted to extend between the computer disk 40 in the disk receiving space 331 and the respective first backing sheet portion 32 to prevent untimely removal of the computer disk 40 from the disk receiving space 331.

It should be noted that the top end of the first front sheet portion 31 of each pouch 33 has two end sections which are disposed on two sides of the retaining flap 333 and which are formed respectively with a curved notch 335 to provide protection to the retaining flap 333 against tearing from the top end of the first front sheet portion 31.

The label retaining unit 34 of each pouch 33 includes a plastic second backing sheet portion 342 extending integrally from a top end of the first backing sheet portion 32, and a plastic second front sheet portion 343 connected sealingly to the second backing sheet portion 342 and formed with a slot. The second front sheet portion 343 cooperates with the second backing sheet portion 342 to define a label receiving space 344 which is adapted to receive a label 341 therein via the slot. The label is used to identify the computer disk 40 to be stored in the disk receiving space 331.

It is noted that, in the present embodiment, each of the pouches 33 is connected integrally to adjacent ones of the pouches 33.

Figure 5:
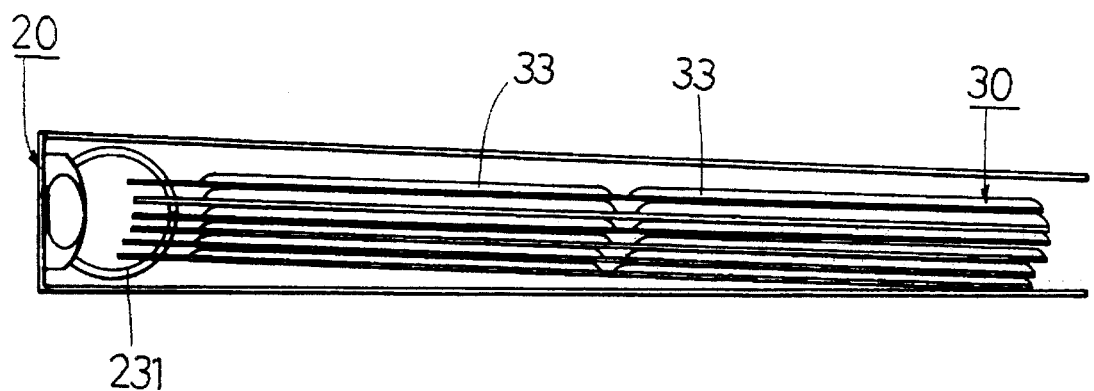
FIG. 5 is a bottom view of the binder assembly according to the present invention.

Accordingly, the binder assembly of the present invention has the following advantages:

1. Referring to FIG. 5, since the ring-shaped retainers 231 can retain a plurality of loose-leaf sheets 30 in the cover unit 20, a plurality of computer disks can thus be stored at a lower storage space requirement. Furthermore, the binder assembly can be conveniently carried by an user.

2. Since each of the pouches 33 is provided with a label retaining unit for receiving a label used to identify the computer disk stored in the disk receiving space, the user can find a desired computer disk easily and quickly.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A binder assembly for receiving computer disks therein, said binder assembly comprising:

a cover unit including rigid back and front covers, a spine portion interconnecting said back and front covers, and a retaining set provided on an inner side of said spine portion; and at least one loose-leaf sheet, each said loose-leaf sheet including a punching unit adapted to engage removably said retaining set on said spine portion, and a pouch unit which is connected to said punching unit at one side and which has at least one pouch, each said pouch including a plastic first backing sheet portion, a plastic first front sheet portion having top and bottom ends and opposite side edges, said first front sheet portion being connected sealingly to said first backing sheet portion at said side edges and at said bottom end, said first front sheet portion cooperating with said first backing sheet portion to define a disk receiving space that is adapted to receive a computer disk therein, and a foldable retaining flap that extends integrally from an intermediate section of said top end of said first front sheet portion and that is adapted to extend between the computer disk in said disk receiving space and said first backing sheet portion to prevent untimely removal of the computer disk from said disk receiving space.

2. A binder assembly as claimed in claim 1, wherein said top end of said first front sheet portion of each said pouch has two end sections disposed on two sides of said retaining flap and formed respectively with a curved notch to provide protection to said retaining flap against tearing from said top end of said first front sheet portion.

3. A binder assembly as claimed in claim 1, wherein each said pouch further comprises a label retaining unit formed on said first backing sheet portion.

4. A binder assembly as claimed in claim 3, wherein said label retaining unit of each said pouch comprises:

a plastic second backing sheet portion extending integrally from said first backing sheet portion; and a plastic second front sheet portion connected sealingly to said second backing sheet portion, said second front sheet portion cooperating with said second backing sheet portion to define a label receiving space which is adapted to receive a label therein, the label being used to identify the computer disk to be stored in said disk receiving space.

5. A loose-leaf sheet to be connected to a binder for receiving computer disks therein, the binder having rigid back and front covers, a spine portion interconnecting the back and front covers, and a retaining set provided on an inner side of the spine portion, said loose-leaf sheet comprising:

a punching unit adapted to engage removably the retaining set on the spine portion; and a pouch unit which is connected to said punching unit at one side and which has at least one pouch, each said pouch including a plastic first backing sheet portion, a plastic first front sheet portion having top and bottom ends and opposite side edges, said first front sheet portion being connected sealingly to said first backing sheet portion at said side edges and at said bottom end, said first front sheet portion cooperating with said first backing sheet portion to define a disk receiving space that is adapted to receive a computer disk therein, and a foldable retaining flap that extends integrally from an intermediate section of said top end of said first front sheet portion and that is adapted to extend between the computer disk in said disk receiving space and said first backing sheet portion to prevent untimely removal of the computer disk from said disk receiving space.

6. A loose-leaf sheet as claimed in claim 5, wherein said top end of said first front sheet portion of each said pouch has two end sections disposed on two sides of said retaining flap and formed respectively with a curved notch to provide protection to said retaining flap against tearing from said top end of said first front sheet portion.

7. A loose-leaf sheet as claimed in claim 5, wherein each said pouch further comprises a label retaining unit formed on said first backing sheet portion.

8. A loose-leaf sheet as claimed in claim 7, wherein said label retaining unit of each said pouch comprises:

a plastic second backing sheet portion extending integrally from said first backing sheet portion; and a plastic second front sheet portion connected sealingly to said second backing sheet portion, said second front sheet portion cooperating with said second backing sheet portion to define a label receiving space which is adapted to receive a label therein, the label being used to identify the computer disk to be stored in said disk receiving space.

9. A pouch for receiving a computer disk therein, said pouch comprising:

a plastic first backing sheet portion;

a plastic first front sheet portion having top and bottom ends and opposite side edges, said first front sheet portion being connected sealingly to said first backing sheet portion at said side edges and at said bottom end, said first front sheet portion cooperating with said first backing sheet portion to define a disk receiving space that is adapted to receive the computer disk therein; and a foldable retaining flap that extends integrally from an intermediate section of said top end of said first front sheet portion and that is adapted to extend between the computer disk in said disk receiving space and said first backing sheet portion to prevent untimely removal of the computer disk from said disk receiving space.

10. A pouch as claimed in claim 9, wherein said top end of said first front sheet portion has two end sections disposed on two sides of said retaining flap and formed respectively with a curved notch to provide protection to said retaining flap against tearing from said top end of said first front sheet portion.

11. A pouch as claimed in claim 9, further comprising a label retaining unit formed on said first backing sheet portion.

12. A pouch as claimed in claim 11, wherein said label retaining unit comprises:

a plastic second backing sheet portion extending integrally from said first backing sheet portion; and a plastic second front sheet portion connected sealingly to said second backing sheet portion, said second front sheet portion cooperating with said second backing sheet portion to define a label receiving space which is adapted to receive a label therein, the label being used to identify the computer disk to be stored in said disk receiving space.

\* \* \* \* \*